United States Patent

[11] 3,539,107

[72] Inventor Reginald John Mitchell
 Coogee, New South Wales, Australia
[21] Appl. No. 755,597
[22] Filed Aug. 27, 1968
[45] Patented Nov. 10, 1970
[73] Assignee McPherson's Limited
 Melbourne, Victoria, Australia
 a corporation of Australia
[32] Priority Aug. 31, 1967
[33] Australia
[31] 26,685/67

[54] IRRIGATION SYSTEMS
 8 Claims, 4 Drawing Figs.
[52] U.S. Cl. ................................................. 239/177,
 239/178, 239/188
[51] Int. Cl. ..................................................... B05b 3/12
[50] Field of Search............................................ 239/177,
 178, 183—191

[56] References Cited
 UNITED STATES PATENTS
 1,255,777 2/1918 Norton......................... 239/177
 1,391,169 9/1921 Case............................. 239/177
 2,622,925 12/1952 Templeton.................. 239/184X
 2,879,945 3/1959 Johnson....................... 239/186X
 3,352,493 11/1967 Curtis........................... 239/177

Primary Examiner—M. Henson Wood, Jr.
Assistant Examiner—John J. Love
Attorney—Kimmel, Crowell and Weaver ABSTRACT: An irrigation system for a field comprising a pipe line carrying water dispersing nozzles and rendered mobile for transverse movement over the field, a swivel coupling for connecting one end of the pipe line to a centrally located hydrant in the field, pulleys for anchorage around the field perimeter, an endless cable reeved over the pulleys and driven for rotation about the field, and means constructed so as not to foul the pulleys for attaching the free end of the pipe line to a point in the cable for drawing the pipe line around the field.

IRRIGATION SYSTEMS

This invention relates to irrigation systems for pastures, meadows and tilled fields and more particularly to systems of this kind which are moved or propelled continuously over the field for regular irrigation thereof.

A most desirable feature of continuously moving irrigation systems is that they function completely automatically and substantially uniformly disperse water in all parts of the field or pasture. There is no great problem in providing an automatic drive which will achieve uniform irrigation on circular shaped fields.

However, as the subdivision of fields and pastures more usually results in rectangular shaped plots, and sometimes plots of quite irregular shape, the mechanical means for automatically driving an efficient irrigation line is complicated and expensive.

It is the main object of this invention to provide an irrigation system having automatic driving means which will irrigate efficiently rectangular and irregular shaped fields and pastures as well as fields of more regular shape.

To this end the invention in one general form is an irrigation system for fields and pastures of regular and irregular shape, comprising coupled irrigation pipes forming a line of at least limited flexibility having plural water discharge means, means for supporting the line above ground level and for transverse movement over the ground, means for swivelled attachment of one end of the line to a hydrant outlet near the centre of the field, a cable means for supporting the cable around the perimeter of the field, means for attaching at least the free end of the line to the cable, and drive means for rotating the cable around the perimeter of the field to draw the pipe line around and into all corners of the field.

A preferred embodiment of the invention is illustrated in the accompanying drawings, in which FIG. 1 is a perspective view of part of the irrigation line and supporting dollies, and shows the central anchorage;

Figure 1:
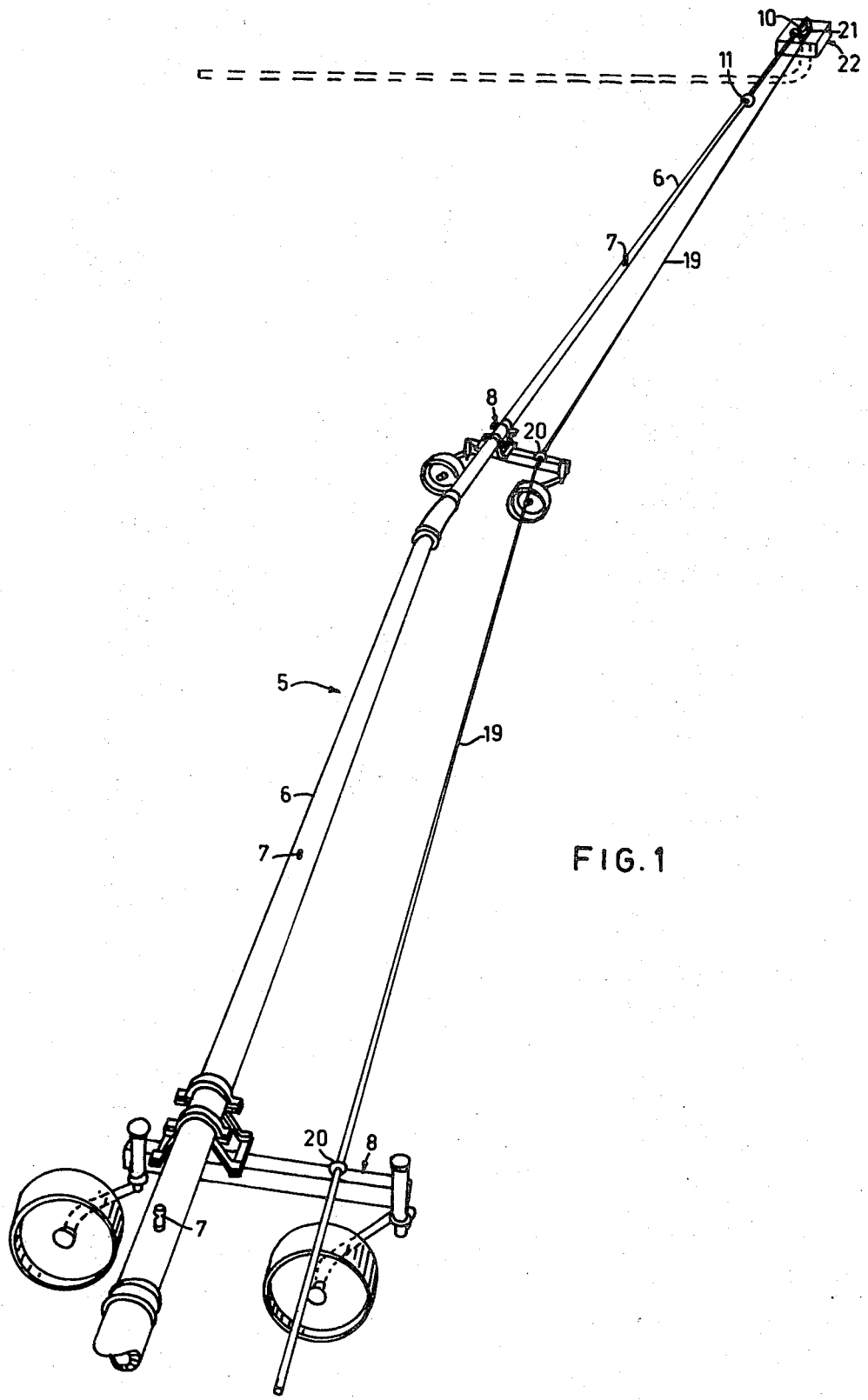

The preferred embodiment of the invention shown by the drawings will now be described in which the irrigation system consists of an irrigating water line 5 composed of a multiplicity of intercoupled irrigation pipe sections 6 providing for limited flexibility in the line 5. Some pipe sections, or most of them are provided with spray nozzles 7 preferably all directed to one side of the line 5. Mobile dollies 8, skids or other means for elevating the line 5 above ground level and rendering it mobile are incorporated on each pipe section 6 or on each group of pipe sections. It is intended that the irrigation line 5 advance over the surface of a pasture 9 in a direction transverse to the length of the line and, preferably, therefore, the dollies or skids 8 are transversely connected at intervals along the line 5. In its application in this invention the line 5 will always advance in the same direction and preferably water spray from its nozzles 7 will be directed behind the line 5 as it advances.

It is intended that a hydrant outlet 10 be disposed near the centre of the field 9 and have means for swivelled attachment of one end 11 of the irrigation line 5. Guide pulleys 12 supported from anchoring shackles 13 are provided to be mounted at spaced intervals around the perimeter of the field 9. Where the perimeter incorporates sharp corners enlarged pulleys 14 with additional facility for anchoring will be located. An endless cable 15 is passed over all of the guide pulleys 12 and 14 so that it is free to pass therethrough so as to continually encircle the field 9.

A connection in the form of a hooked-end metal link 16 is attached by clamping bolts 17 to the side of the cable 15 facing outwardly of the field 9 and its free end 18 is connected to a cable 19 which is secured to each irrigation line dolly 8 by eye bolts 20 and is anchored to a swivel coupling 21 upon an anchor block 22 in the centre of the field 9 coaxially with the hydrant outlet 10. The purpose of the eye bolts 20 is to provide a loose connection of the dollies 8 to the cable 19. Alternatively, a pair of confronting pulleys may be provided. The purpose is to allow freedom for the cable 19 to move with respect to each dolly 8. It has been found that this is desirable in order to isolate the drawing force from the pipe couplings which might otherwise separate the couplings and break the line.

The shackles 13 are approximately of J-shape with the pulley 12 or 14 rotatably accommodated on a shaft between the confronting arms 13A and 13B with a longer arm 13B extending beyond the pulley from beneath. A straight shank portion 29 of the link 16 passes over the upper side of the pulley 12 or 14 in its passage around the field 9. As the cable passes around its line or lines of pulleys 12 and 14 the connecting link 16 passes freely around them and the cable 19 and link 16 function to draw the outer end 23 of the pipe line 5 along with the cable 15.

Where the field 9 is of say rectangular shape, i.e. having normally inaccessible corners for existing irrigation systems, the length of the irrigation line 5 will approximate half the length of a diagonal thereof. On the shorter radii of the rectangular pasture the line 5 being somewhat flexible will bow to arcuate shape as at 5A while irrigation continues. The spacing of the spray nozzles 7 on the line 5 may, therefore, be arranged to compensate for the different spacing of tracking of the individual pipe sections 6 in different parts of the pasture 9, so that irrigation is substantially uniform over the pasture.

Hitherto, it has been necessary to provide a high pressure water supply in order to effect automatic drive of the irrigation line 5. In the present instance the system functions efficiently with only a low pressure water supply at the hydrant 10. Two counter rotating driving drums 24 and 25 (FIG. 3) connected to a prime mover 26 may serve to continuously drive the cable 15 around the perimeter of the pasture 9 and it has been found that in one instance a single rotation of the irrigation line 5 about an irregular shaped pasture over a period of every 15 days produces irrigation comparable to 2 inches of rain.

Figure 3:
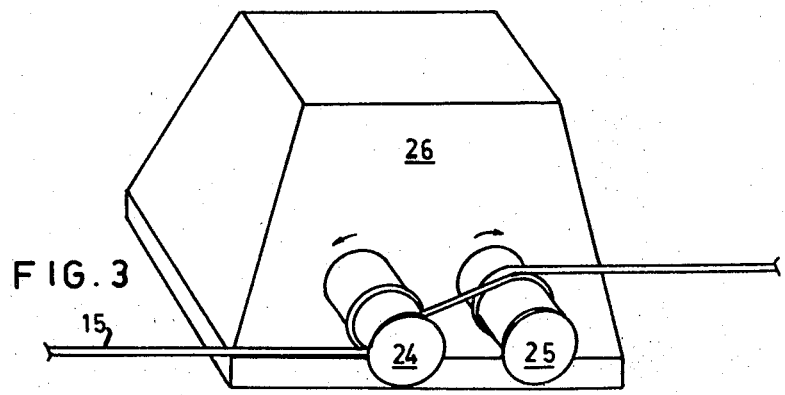
FIG. 3 is a perspective view showing a method of imparting drive to the cable from the prime mover; and, FIG. 4 is a plan view of a typical field showing an irrigation system according to the invention installed.
Figure 4:
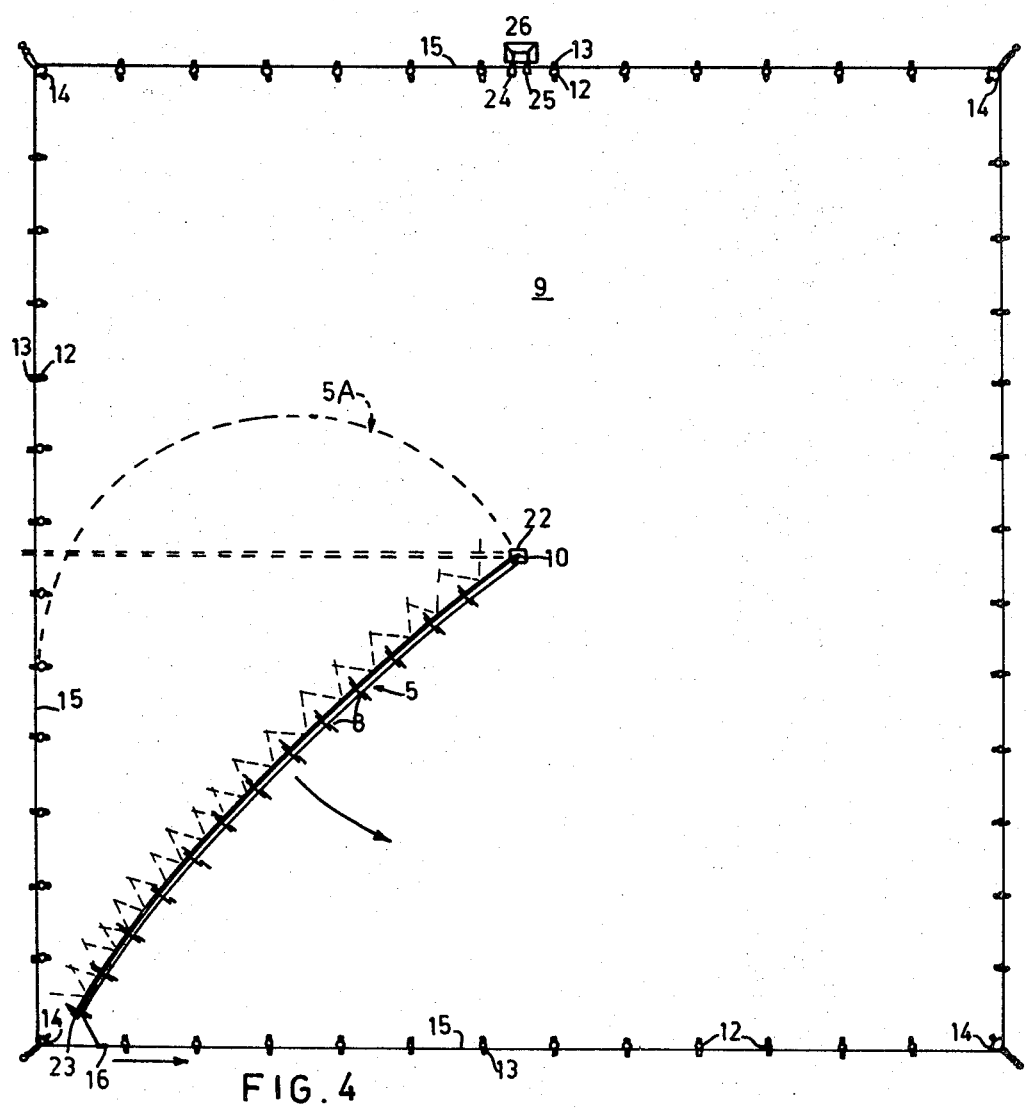

With reference to FIG. 3, it can be seen that the cable 15 may be passed one turn around the drum 24 in an anticlockwise direction and similarly around the drum 25 in a clockwise direction. This ensures a positive drive to the cable 15.

Figure 2:
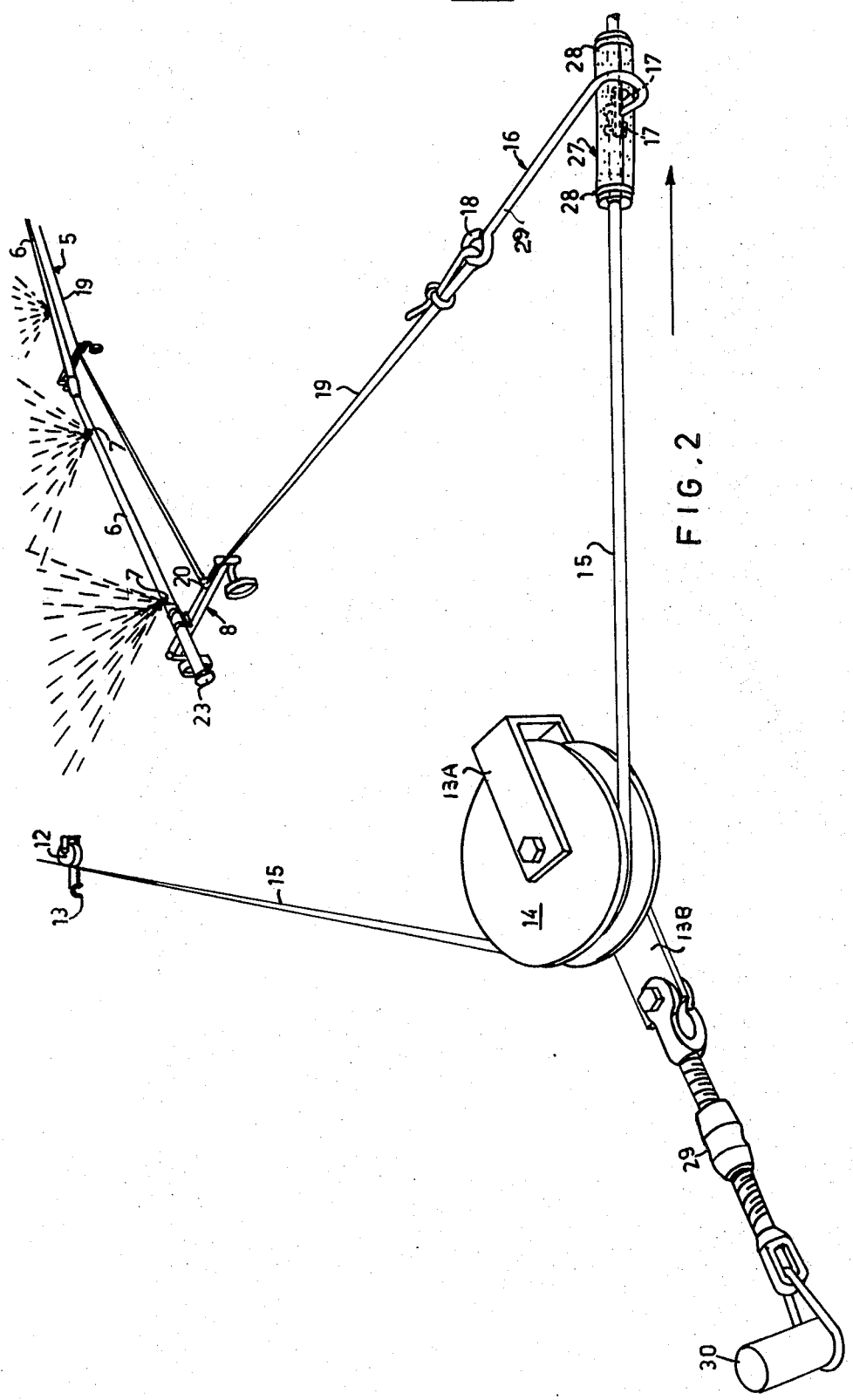
FIG. 2 is a perspective view of a corner pulley and also shows the connection of the irrigation line to the endless cable.

When the connecting link 16 reaches the prime mover 26, the prime mover is stopped, and the link 16 disconnected from the cable 15 by releasing the bolts 17 (FIG. 2). The irrigation line 5 is then dragged past the prime mover and reconnected to the cable 15.

In order to ensure that the bolts 17 clamping the link 16 to the cable 15 do not foul the pulleys 12 and 14 as they pass around them, a split rubber tube 27 is fitted over the clamp bolts and cable and secured thereto by clips 28. Turnbuckles 29 are also incorporated between the pulleys 14 and their anchorages 30 so that a degree of tension can be maintained in the cable 15.

Whereas a preferred embodiment has been described in the foregoing passages it is to be understood that other forms of the invention are feasible within the scope of this invention.

I claim:

1. An irrigation system for fields and pastures of regular and irregular shape comprising coupled irrigation pipes forming a line of at least limited flexibility having plural water discharge means, spaced carriages for supporting the line above ground level and for transverse movement over the ground, means for swivelled attachment of one end of the line to a hydrant outlet near the centre of the field, a cable, means for retaining the cable for rotation around the perimeter of the field, means for attaching the pipe line to the cable including a hawser anchored with respect to the ground at one end and connected with the cable near its other end, each of said supporting carriages being loosely connected to the hawser, and drive means for rotating the cable around the perimeter of the field to draw the pipe line around and into all corners of the field.

2. An irrigation system as claimed in claim 1, wherein the means for supporting the cable is a plurality of pulleys anchored at intervals around the field perimeter.

3. An irrigation system as claimed in claim 1, wherein the attachment means for the line to the cable further comprises a link connecting the hawser with the cable and having a shank and a hooked portion to step the shank clear of the supporting pulleys during rotation of the cable about the field.

4. An irrigation system as claimed in claim 3, wherein the link is detachably secured to the cable to permit its removal on each revolution of the cable as the link approaches the drive means.

5. An irrigation system as claimed in claim 4, wherein the drive means comprises a prime mover, drum means driven by the prime mover and around which the cable is wound.

6. An irrigation system as claimed in claim 5, wherein the drum means are two drums driven in counter directions and the cable is wound over one drum in one direction and over the other drum in the opposite direction.

7. An irrigation system for a field, comprising a line of irrigation pipes coupled to provide a degree of flexibility throughout the line, a plurality of water discharge nozzles spaced along the pipe line, a plurality of mobile carriages spaced along the pipe line to support same above ground level and providing for advancement of the pipe line in a transverse direction over the field, a swivel attachment on one end of the pipe line for connection to a hydrant located near the centre of the field, pulleys and anchoring means therefore for location at spaced intervals around the perimeter of the field, a prime mover, driving drum means rotated by the prime mover, a cable reeved over the pulleys and around the driving drum means, a link detachably secured to one point in the cable, a hooked portion on the link to enable it to clear the pulleys in the passage of the cable around the perimeter of the field, and a hawser anchored at one end to near the centre of the field and loosely coupled to each of the mobile carriages and connected to the link to draw the pipe line around the field.

8. An irrigation system as claimed in claim 7, wherein the driving drum means comprises a pair of drums rotatably driven in opposite directions, said cable being wound around each drum in an opposite direction from the other.